United States Patent [19]
Ito et al.

[11] Patent Number: 5,227,258
[45] Date of Patent: Jul. 13, 1993

[54] FUEL ELECTRODES FOR SOLID OXIDE FUEL CELLS AND PRODUCTION THEREOF

[75] Inventors: Shigenori Ito, Kasugai; Kiyoshi Okumura, Tajimi; Katsuki Yoshioka, Nagoya, all of Japan

[73] Assignee: NGK Insulators, Ltd., Japan

[21] Appl. No.: 755,577

[22] Filed: Sep. 5, 1991

[30] Foreign Application Priority Data

Sep. 26, 1990 [JP] Japan ............... 2-254107

[51] Int. Cl.$^5$ ............... H01M 4/88; H01M 4/90
[52] U.S. Cl. ............... 429/40; 427/115; 428/472.1
[58] Field of Search ............... 429/30, 40; 427/115, 427/380; 428/472.1

[56] References Cited

U.S. PATENT DOCUMENTS

| | | | |
|---|---|---|---|
| 3,061,482 | 10/1962 | Grant | 428/472.1 X |
| 3,578,502 | 5/1971 | Tannenberger et al. | 429/30 X |
| 4,582,766 | 4/1986 | Isenberg et al. | 429/30 |
| 4,767,518 | 8/1988 | Maskalick | 429/40 X |
| 4,812,329 | 3/1989 | Isenberg | 429/115 |
| 5,021,304 | 6/1991 | Ruka et al. | 429/30 |

FOREIGN PATENT DOCUMENTS

61-225778 10/1986 Japan.
1-302669 12/1989 Japan.
2-72558 3/1990 Japan.

Primary Examiner—Stephen Kalafut
Attorney, Agent, or Firm—Parkhurst, Wendel & Rossi

[57] ABSTRACT

A fuel electrode for solid oxide fuel cells, which is to be provided on a surface of an ion-conductive solid electrolyte body, includes a skeleton for a porous fuel electrode, and a thin filmy tissue which is composed of the same material as the solid electrolyte body, and covers the fuel electrode skeleton. Gaps are present between the thin filmy tissue and the fuel electrode skeleton. The skeleton is made of a material containing at least nickel. A process for producing fuel electrode includes the steps of: forming a porous film made of a porous skeleton containing at least nickel oxide onto a surface of an ion-conductive solid electrolyte body; covering a surface of the porous skeleton with a thin filmy tissue made of the said solid electrolyte material by impregnating the porous film with a solution of a metallic compound capable of producing the same solid electrolyte material as that of the solid electrolyte body; heating the porous film and decomposing the metallic compound; and forming a porous skeleton containing at least nickel by reducing the porous film, and forming gaps between the fuel electrode skeleton and the thin filmy tissue by a decrease in volume of the porous skeleton resulting from reduction of nickel oxide to nickel.

11 Claims, 9 Drawing Sheets

FIG_1

FIG_2

FIG_3

FIG_4

FIG_5

FIG_6

FIG_7

Characteristics of Cell Using Conventional Fuel Electrode
(Standard Cell) (After Discharged at 200mA/cm² for 20hours)

FIG_8

Characteristics of Cell Using Fuel Electrode of Invention
(Test Cell No.1) (After Discharged at 200mA/cm² for 20hours)

FIG_10

Illustrative View of Photgraph in FIG_3
(1) Fuel Electrode Skelton
(2) Thin Filmy Tissue
(3) Gap

FIG_11

SEM Photograph of Polished Surface
of Fuel Electrode of Invention

FIG_12

Illustrative View of FIG_11
(1) Fuel Electrode Skelton
(2) Thin Filmy Tissue
(3) Gap

FUEL ELECTRODES FOR SOLID OXIDE FUEL CELLS AND PRODUCTION THEREOF

BACKGROUND OF THE INVENTION

1. Field of the Invention

The present invention relates to fuel electrodes for solid oxide fuel cells and a process for the production thereof.

2. Related art statement

Fuel cells have recently been noted as power generators, and are a very promising technique, for generating power since the fuel cells can directly convert chemical energy possessed by a fuel into electrical energy, and are not limited by the Carnot's cycle. Further, the cells have essentially high energy conversion efficiency, can use of a variety fuels (naphtha, natural gas, methanol, coal reformed gas, heavy oil, etc) with low public nuisance, and their power generating efficiency is not influenced by the installation scale.

Particularly, since the solid oxide fuel cell (hereinafter referred to as SOFC) operates at high temperature) of about 1,000° C., electrochemical reaction on its electrodes is extremely high. Thus, SOFC expensive noble metal catalysts such as platinum, has small polarization, and relatively high output voltage, consequently, its energy converting efficiency is very high compared with other fuel cells. Further, since SOFC is entirely constituted by solids, it has stability and long life.

Since a voltage loss of the SOFC is great due to polarization of the fuel electrode, a primary problem is how to lower the polarization by enhancing activation of the fuel electrode to elevate output of the SOFC. At present, a cermet of nickel-zirconia is popularly used as a material for fuel electrodes. However, in an operating temperature range of the SOFC (for example, 900° to 1,000° C.), flocculation and sintering of nickel as a reaction catalyst proceed to accelerate activated polarization. In order to prevent such phenomena, a variety of techniques have been proposed.

One of them is to form a porous skeleton around nickel grains by EVD (electrochemical vapor deposition) after coating and drying of a nickel slurry on a solid electrolyte (Unexamined Japanese patent application publication No. 61-225,778). However, since this technique is a vapor deposition, reacting conditions are complicated, a processing speed is low, a processing time is long, and a cost is high. Therefore, productivity is low. In addition, existing SOFCs cannot cope with a current large scale and large area tendency.

Another technique is also proposed to coat nickel grains with an electron-conductive oxide by forming a fuel electrode, impregnating the fuel electrode with a solution of an organic metallic compound capable of forming the electron-conductive oxide through thermal decomposition, and thermally decomposing it (Unexamined Japanese patent application No. 1-302,669). However, this technique cannot exhibit high catalytic power possessed by nickel because the nickel grains are coated with a film.

Yet another technique is proposed to form a nickel film on a porous skeleton preliminarily formed from zirconia by impregnating the porous skeleton with a nickel slurry (Unexamined Japanese patent application No. 2-72,558). Furthermore, another more popular technique is proposed to calcine a mixture of nickel oxide and yttria-stabilized zirconia, mill the mixture, and form and fire a film (The 56th annual meeting of the electrochemical society of Japan, 1G31, 1989). However, it is difficult for these techniques to increase the reacting area of nickel.

Further, in any of the above techniques, high temperatures of not less than 1,200° C. are necessary to form a fuel electrode having high performance, which exerts an adverse influence upon other parts of the SOFC and poses a limitation upon constituent materials.

SUMMARY OF THE INVENTION

An object of the present invention is to solve the above-mentioned problems, and to provide fuel electrodes and a process for producing the same, which can increase a reacting area of nickel to enhance activity of the electrode, inhibit flocculation and sintering of nickel during operation of an SOFC to prevent deterioration on passing of current, and exhibit their excellent function and effects by processing them at relatively low temperatures.

The present invention relates to a fuel electrode for solid oxide fuel cells, said fuel electrode being provided on a surface of an ion-conductive solid electrolyte body and including nickel, said fuel electrode comprising a porous skeleton for the fuel electrode, and a thin filmy tissue, gaps being present between the thin filmy tissue and the fuel electrode skeleton, said skeleton being made of a material for the fuel electrode, this material containing at least nickel, said thin filmy tissue being composed of the same solid electrolyte material as that of the solid electrolyte body, and said thin filmy tissue covering the fuel electrode skeleton.

Further, the present invention also relates to a process for producing a fuel electrode for solid oxide fuel cells, said process comprising the steps of: forming a porous film made of a porous skeleton containing at least nickel oxide onto a surface of an ion-conductive solid electrolyte body; impregnating the porous film with a solution of a metallic compound capable of producing the same solid electrolyte material as that of the solid electrolyte body, and covering the surface of the porous skeleton with a thin filmy tissue made of said solid electrolyte material by heating the porous film and thermally decomposing the metallic compound; and forming a porous skeleton for the fuel electrode by reducing the porous film, the skeleton being made of a fuel electrode material containing at least nickel, and forming gaps between the fuel electrode skeleton and the thin filmy tissue by decrease in volume of the porous skeleton resulting from reduction of nickel oxide to nickel.

In the present invention, as the "fuel electrode material containing at least nickel", nickel and nickel-zirconia composite material may be recited.

As the "solid electrolyte material", for example, zirconia stabilized or partially stabilized with $Y_2O_3$, CaO, MgO and/or $Yb_2O_3$ may be recited. "The same solid electrolyte material as that of the solid electrolyte body" means that this material has the same material system as that of the solid electrolyte body, and that the former may have a content ratio and a kind of a stabilizer different from those of the solid electrolyte body. For example, the solid electrolyte body and the thin filmy tissue may be made of yttria-stabilized zirconia and yttria partially stabilized zirconia, respectively. Further, the solid electrolyte body and the thin filmy tissue may be made of $Y_2O_3$-stabilized zirconia and CaO-stabilized zirconia, respectively.

That "the fuel electrode skeleton is covered with the thin filmy tissue" includes both a case where the entire fuel electrode skeleton is covered with the thin filmy tissue and a case where the fuel electrode skeleton is partially covered with the thin filmy tissue. That "the gaps are present between the thin filmy tissue and the fuel electrode skeleton" means not only that the thin filmy tissue has no contact with the fuel electrode skeleton, but also that the thin filmy tissue partially contacts the fuel electrode skeleton.

The "solid electrolyte body" may be filmy, planar or tubular.

Since the thin filmy tissue is made of the same material as that of the solid electrolyte body, and formed by using a solution of a metallic compound having good sinterability as a starting material, the thin filmy tissue has excellent affinity with the solid electrolyte body, and the thin filmy tissue is integrated with the solid electrolyte. This effect is conspicuous when the surface of the solid electrolyte body has a rough structure, because the solution of the metallic compound easily to permeate the solid electrolyte body.

Figure 1:
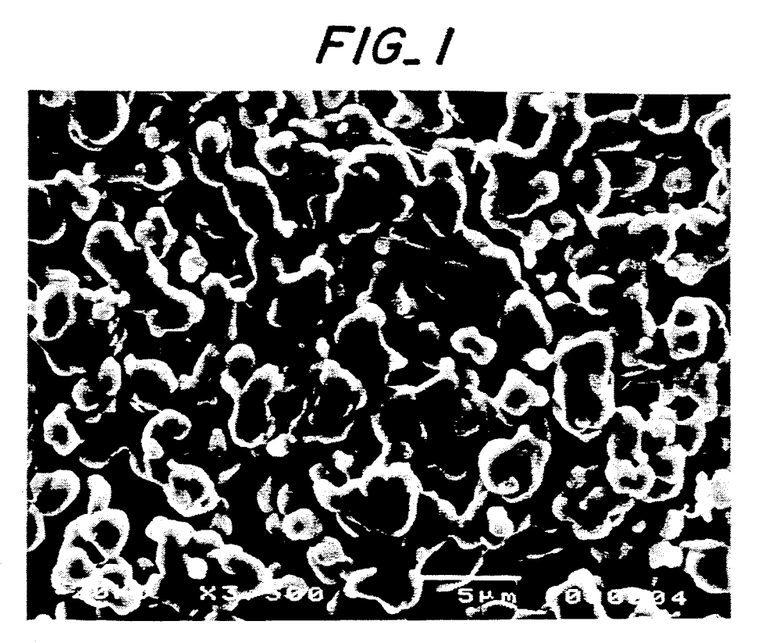
FIG. 1 is a scanning type electron microscope (hereinafter referred to briefly as SEM) photograph showing a microstructure of a tissue of a porous skeleton made of nickel oxide.

In order to produce the fuel electrode according to the present invention, a porous film as a porous skeleton containing at least nickel oxide (NiO) is first formed on the surface of an ion-conductive solid electrolyte body. At this time, the porous skeleton may be nickel oxide alone. Alternatively, the skeleton may be formed by sintering a mixed powder of nickel oxide-zirconia or the like. The porous skeleton need not be fired at such high temperatures as to give sufficient mechanical strength thereto since the mechanical strength is assured by the below-mentioned thin filmy tissue. Since this porous skeleton is rather a reaction catalyst, it is preferable that the porous skeleton is baked at such a degree that growth of NiO grains may not be proceeded by sintering to assure a wide reacting area. By so doing, the nickel grains are combined to form the porous skeleton as shown in FIG. 1.

Figure 2:
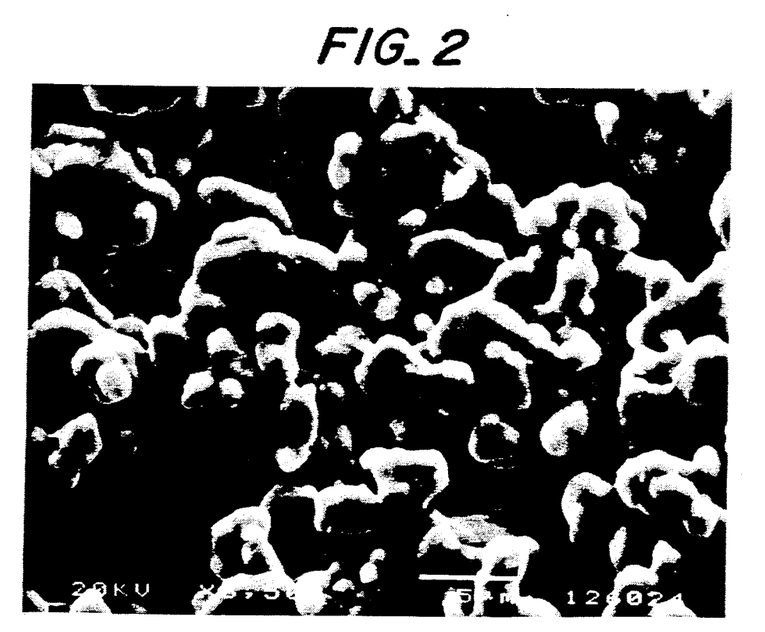
FIG. 2 is an SEM photograph showing a microstructure of a filmy tissue obtained by repeatedly impregnating a film of nickel oxide with a solution of a metallic compound and thermally decomposing the metallic compound (the porous skeleton is covered with the thin filmy tissue)
Figure 3:
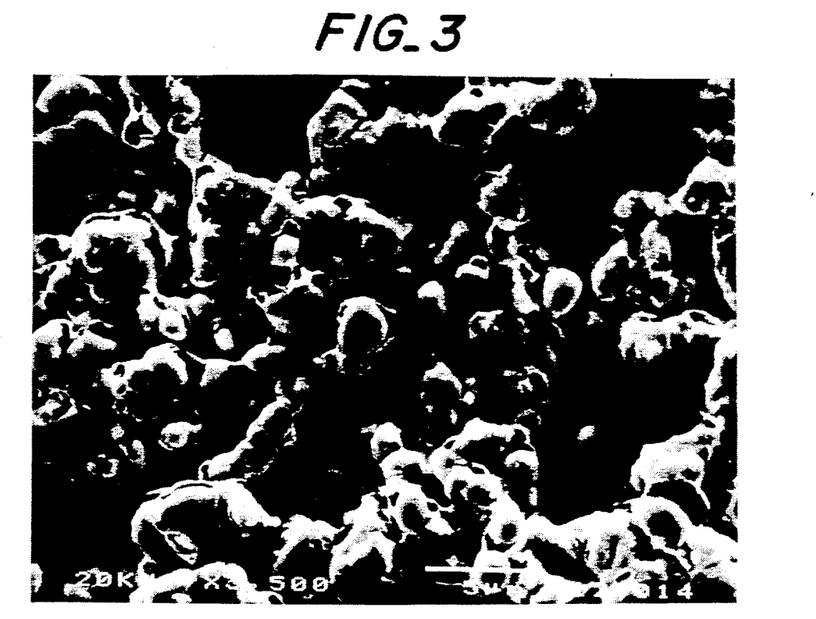
FIG. 3 is an SEM photograph showing a microstructure of a shell-like thin filmy tissue having undergone reduction of nickel oxide (The outer side of the fuel electrode skeleton is covered with the thin filmy tissue)

Next, the porous film is impregnated with a solution of a metallic compound capable of producing the same solid electrolyte material as that of the solid electrolyte body through thermal decomposition, and the metallic compound is thermally decomposed by heating the porous film. By so doing, the surface of the porous skeleton is covered with the thin filmy tissue made of the solid electrolyte material as shown in FIG. 2. Since the thin filmy tissue is made of the same material as that of the underlying solid electrolyte body, it is integrated with and continued to the underlying solid electrolyte body. In order to improve adhesion between the solid electrolyte body and the electrode, it is preferable to integrate them.

"Metallic compound" referred to here may be a mixture of two or more kinds of metallic compounds. For example, when a salt between an organic acid and zirconium and a salt between an organic acid and yttrium is used, a thin filmy tissue composed of yttria-stabilized zirconia or partially stabilized zirconia having a given mixed rate can be formed.

As "the metallic compound", a metallic soap such as naphthenate and an octylate, a metal alkoxide, a metal amide, an acetate and a nitrate are preferred.

The heating temperature for the thermal decomposition may be 400° C.-800° C., but 900° C.-1,000° C. is preferred in order to sufficiently advance crystallization and increase mechanical strength. Further, it is preferable to repeatedly effect the impregnation and the thermal decomposition several times. This is because the thermal decomposition inherently generates a gas on way of the decomposition, and therefore a dense film having sufficient strength cannot be obtained by single thermal decomposition. In order to fully permeate the solution into the porous skeleton, it is necessary to suppress the viscosity of the solution of the metallic compound to a low level. Ideally, it is preferable to coat a dilute solution of the metallic compound and thermally decompose the salt at 900° C.-1,000° C. at as many times as possible. As a preferable example, it is suggested that the porous skeleton is repeatedly subjected to impregnation with a metallic compound solution containing 3 to 10 wt % of a metallic component, and thermal decomposition for 400° C.-1,000° C. at 5 to 30 times, and the thermal decomposition is effected at 900° C.-1,000° C. at least once at the final time during the repeated impregnation and thermal decomposition.

Figure 10:
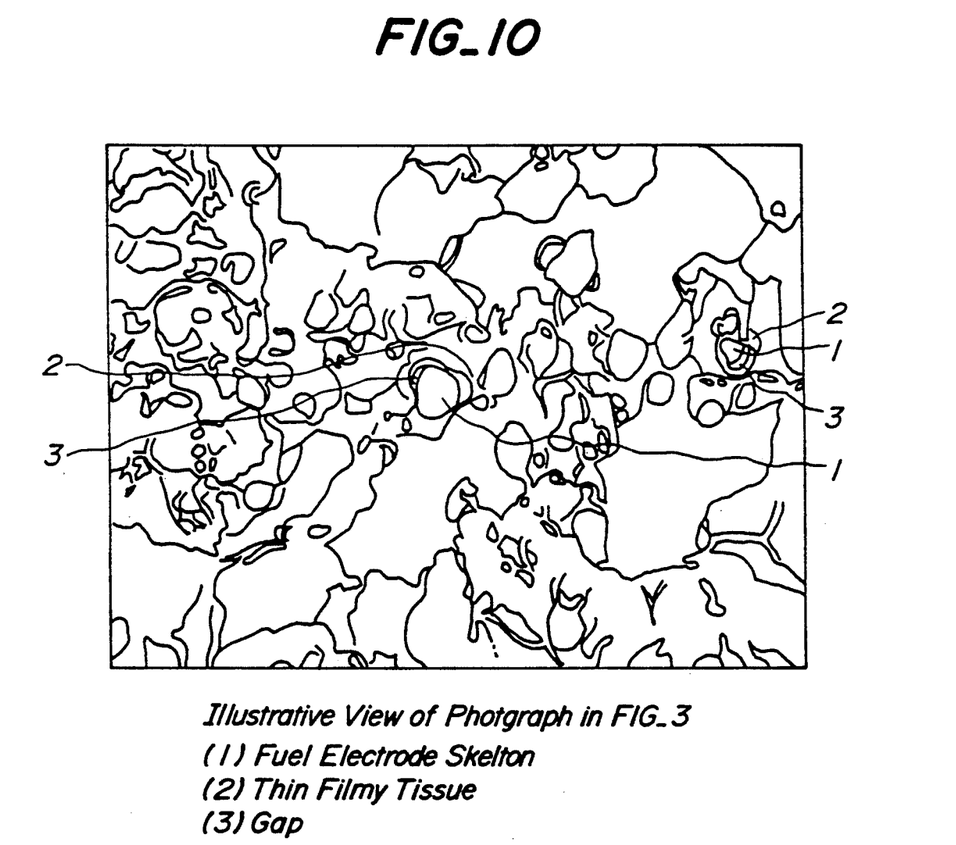
FIG. 10 is a graph showing an illustrative view of the SEM photograph of FIG. 3.
Figure 11:
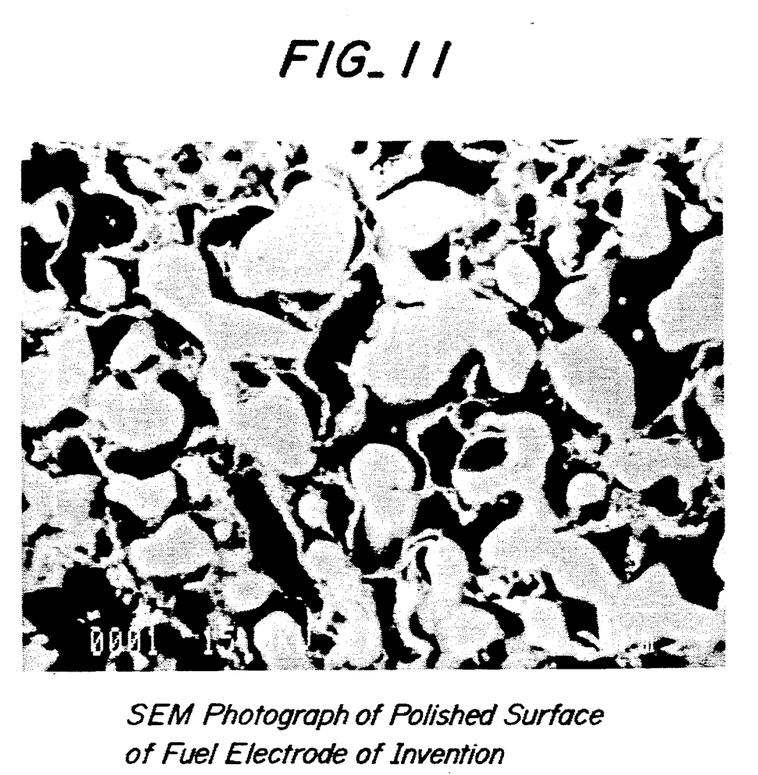
FIG. 11 is an SEM photograph showing a polished surface of another fuel electrode according to the present invention.
Figure 12:
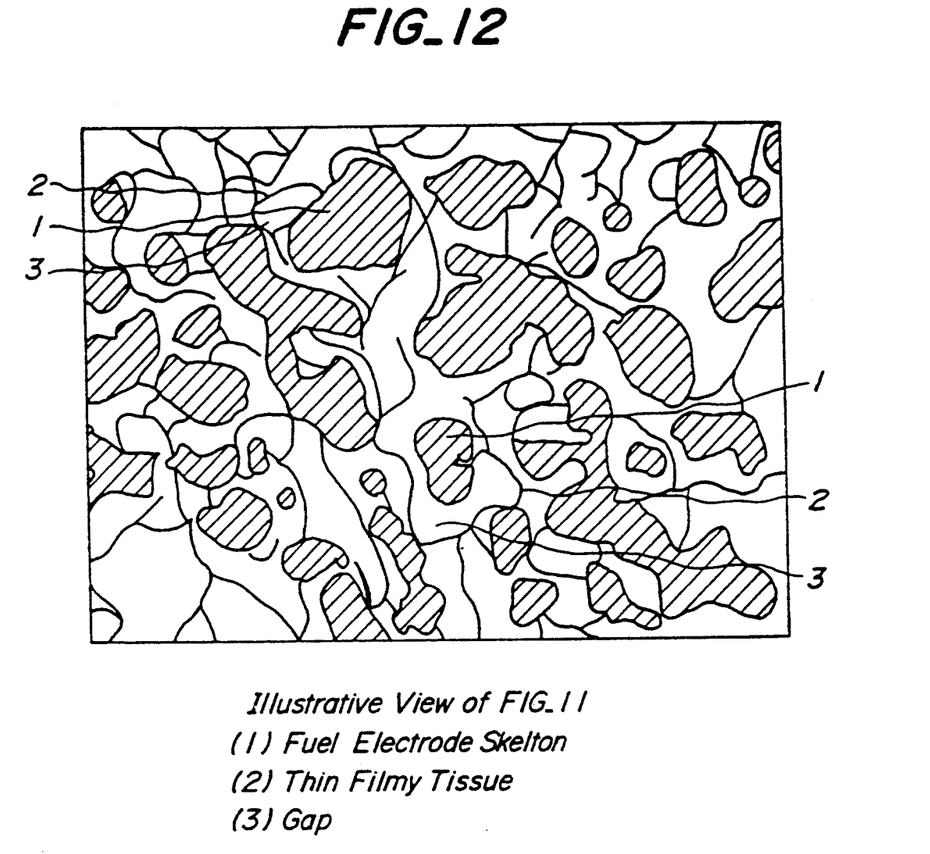
FIG. 12 is an illustrative view of the SEM photograph of FIG. 11.

Next, nickel oxide is converted to nickel by reducing the porous film. As a result, the porous skeleton is converted to a skeleton made of the fuel electrode material containing at least nickel for the porous fuel electrode. Since the volume of the porous skeleton is decreased following the reduction of nickel oxide to nickel, the fuel electrode skeleton shrinks slightly. However, since the thin filmy tissue does not shrink, gaps 3 are formed between the fuel electrode skeleton 1 and the thin filmy tissue 2 as shown in FIGS. 10, 11 and 12.

Figure 4:
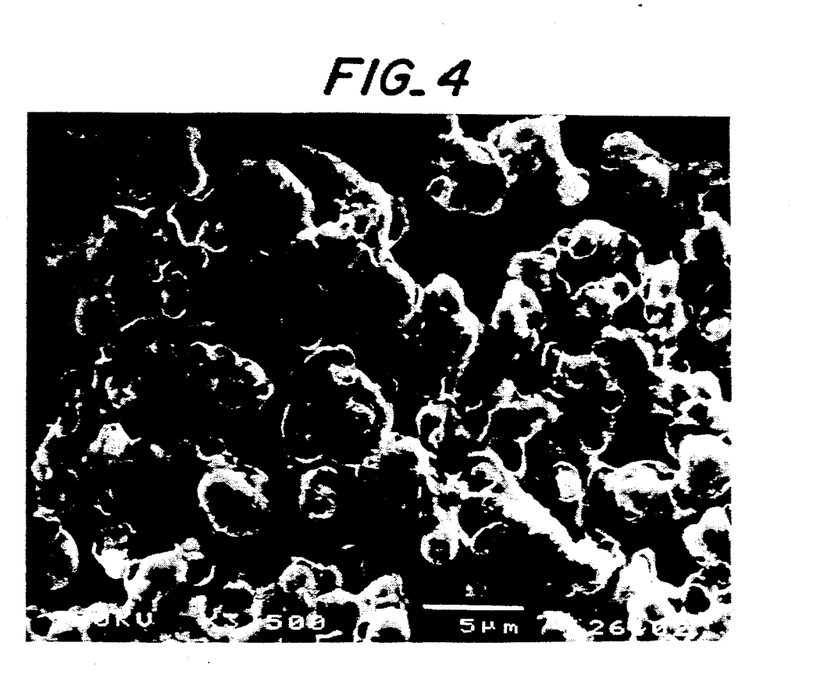
FIG. 4 is an SEM photograph showing a microstructure of a filmy tissue of a fuel electrode through which electric current has been passed.

According to the fuel electrode of the present invention thus prepared, since the porous fuel electrode skeleton made of the fuel electrode material containing at least nickel is covered with the thin filmy tissue, the fuel electrode material can be prevented from being flocculated and sintered during the operation of the SOFC as shown in FIG. 4, so that the deterioration of the SOFC on application of electric current can be prevented.

Further, since the skeleton is made of the fuel electrode material containing at least nickel, and baked at relatively low temperatures, the surface area of nickel is substantially limited to that of an original powder of nickel oxide. Therefore, the reacting area of nickel is greatly different from conventional fuel electrodes in which a skeleton is formed with yttria-stabilized zirconia. In addition, since gaps are present between the thin filmy tissue and the fuel electrode skeleton, a three-phase interface directly participating in the reaction on the electrode is extremely great, so that the activity of the electrode is very large.

Since the porous film is impregnated with the solution of the metallic compound, and the metallic compound is thermally decomposed by heating the porous film, the fuel electrode having high performance can be produced at lower temperatures than that for conventional fuel electrodes.

Furthermore, since the thin filmy tissue is constituted by the same solid electrolyte material as that of the solid electrolyte body, the filmy tissue and the solid electrolyte body have good bondability, so that the thin filmy tissue does not peel due to a difference in thermal expansion between them.

Moreover, even when the solid electrolyte body is not completely dense, defects of the electrolyte body can be eliminated by an effect of sealing pin holes.

These and other objects, features and advantages of the invention will be appreciated when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

The present invention will be explained below in more detail based on specific examples.

A porous thin film made of nickel oxide was formed in a thickness of about 30 μm on the surface of a solid electrolyte plate made of yttria-stabilized zirconia and having a thickness of 1 mm by screen printing, and the porous thin film was impregnated, by painting, with a solution of a metallic compound capable of producing yttria-stabilized zirconia through thermal decomposition. Finally, a fuel electrode according to the present invention was produced by thermal decomposition and reduction.

The thin film of nickel oxide on which a electrode reaction occurred was prepared as follows:

A nickel oxide powder having an average particle size of 2 μm was used as a raw powder, and a binder of ethylcellulose and a dispersant of terpentine oil were added to the powder in amounts of 1.5 parts by weight and 300 to 600 parts by weight, respectively as measured extrapolatorily. The mixture was mixed in a crucible, and a porous skeleton was screen printed with the resulting paste, which was dried at 90° C. for 2 hours and baked at 1,200° C. for one hour.

As the solution of the metallic compound used for the impregnation, a solution in which a mineral spirit solution of zirconium naphthenate (content of zirconium: 4 wt %) and a toluene solution of yttrium naphthenate (content of yttrium: 5 wt %) were mixed in a weight rate of 87.7:12.3 to form 8 mol % yttria-stabilized zirconia after thermal decomposition. This solution was impregnated into the thin film of nickel oxide by painting, followed by drying at room temperature for 2 hours and thermal decomposition at 650° C. for 30 minutes. After cooling, impregnation-thermal decomposition was further repeated 15 times. The thermal decomposition conditions at each of fifth, tenth and fifteenth times were set to 1,000° C. for 30 minutes. When the thermal decomposition was effected on a quartz glass plate, the thin film was cubic 8 mol % yttria-stabilized zirconia. Then, the thin film of nickel oxide was reduced to prepare a fuel electrode according to the present invention. A rear side of the solid electrolyte plate was coated with a known raw material of La(Sr)MnO$_3$ by screen printing, which was baked at 1,000° C. for 1 hour. Platinum wire was baked onto a side surface of the solid electrolyte plate with a platinum paste as a reference electrode for evaluation of the electrode by a three terminal method. Thus, test cells (Nos. 1 and 2) for a fuel oxide fuel cell were prepared by the above steps.

A fuel electrode prepared by a conventional process was baked in a thickness of about 30 μm onto the surface of a 1 mm thick solid electrolyte plate made of yttria-stabilized zirconia by screen printing to prepare a standard cell for comparison. This fuel electrode was composed of Ni-8YSZ cermet in which nickel and zirconia stabilized with 8 mol % yttria were contained in a volumetric rate of 8:2. The 8 mol % yttria-stabilized zirconia was prepared by calcining a co-precipitated powder at 1,300° C. for 10 hours, milling the powder and passing the milled powder through a screen of 150 meshes. Nickel prepared by thermally decomposing nickel acetate was used as nickel. Thus obtained zirconia and nickel were measured, and mixed, and the resulting mixture was calcined at 1,400° C. for one hour, milled in a mortar, and passed through a screen of 325 meshes, thereby preparing a raw material powder. The powder was added with 1.5 parts by weight of a binder of ethylcellulose and 300 to 600 parts by weight of a dispersant of turpentine oil as measured extrapolatorily, followed by mixing in the mortar. The thus prepared paste was screen printed, dried at 90° C. for 2 hours, and baked at 1,200° C. for one hour. An air electrode and a reference electrode were formed in similar manners as for the test cells (Nos. 1 and 2).

Figure 7:
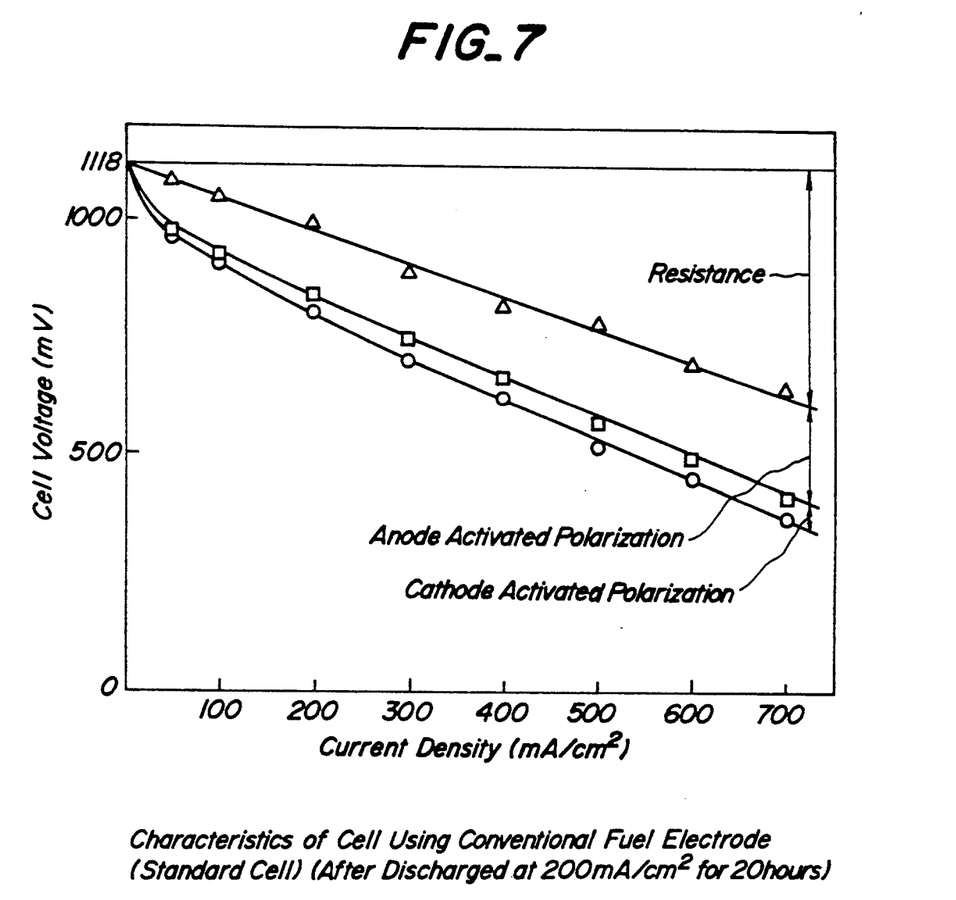
FIG. 7 is a graph showing characteristics of the standard cell using the conventional fuel electrode.
Figure 8:
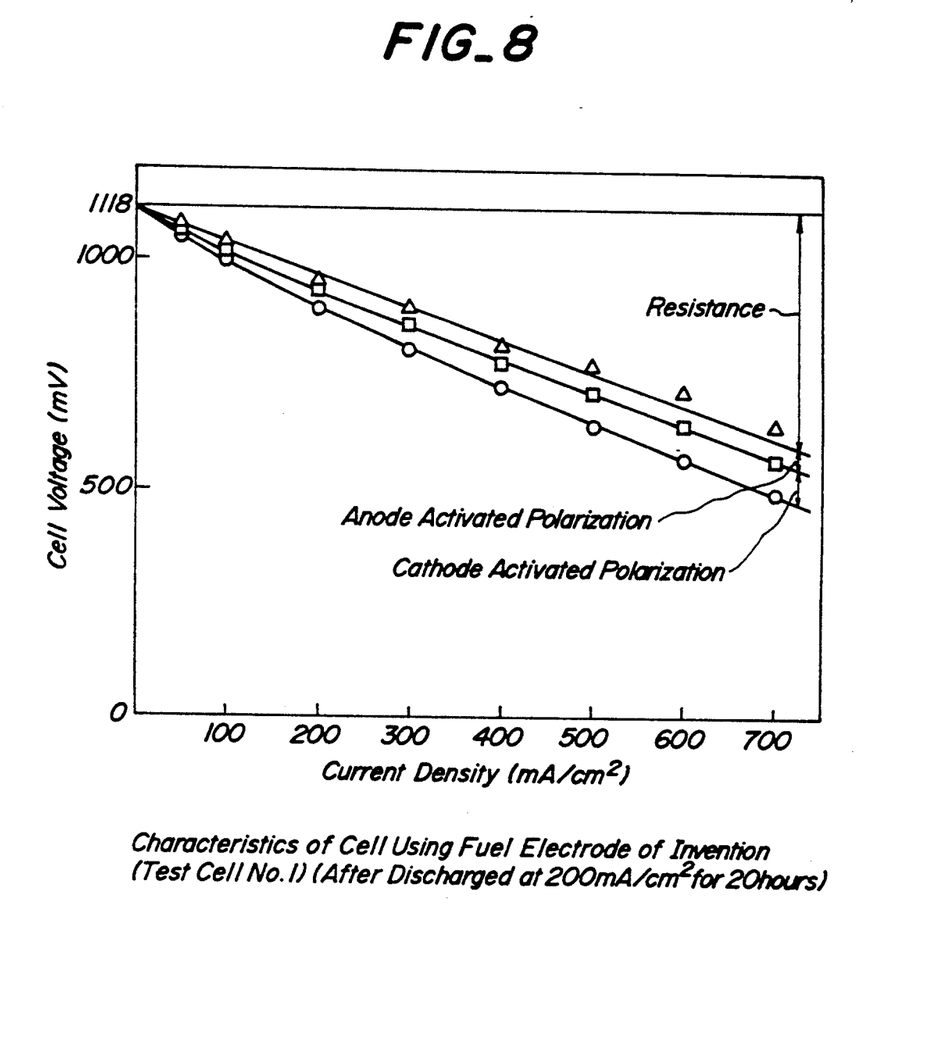
FIG. 8 is a graph showing characteristics of a test cell using a fuel electrode according to the present invention.
Figure 9:
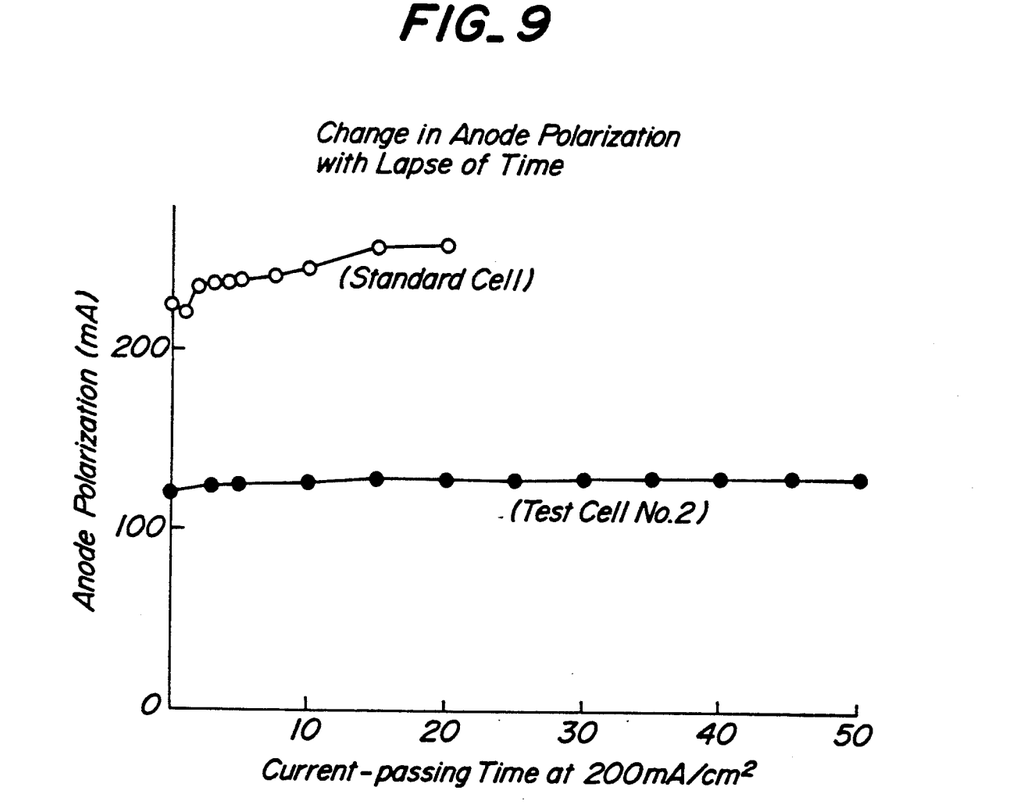
FIG. 9 is a graph showing changes in polarization of an anode with lapse of time.

The test cell (No. 1) and the standard cell were operated at 1,000° C., while hydrogen wetted at room temperature, and oxygen were used as an anode gas and a cathode gas, respectively. Current was passed through each cell at 200 mA/cm$^2$ for 20 hours to stabilize the fuel electrode, and then charge transfer resistance (corresponding to a diametrical portion of an arc in the cole-cole plot) was measured by a complex impedance analysis. Results are that the standard cell prepared by the conventional fuel electrode-producing process exhibited 3 Ωcm$^2$, whereas the test cell (No. 1) exhibited 0.06 Ωcm$^2$. Thus, activity of the electrode of the present invention was greatly improved. Thereafter, characteristics of the cells were measured by a current interruption method. Measurement results of the standard cell and those of the test cell (No. 1) were shown in FIGS. 7 and 8, respectively. It is seen from these figures that the percentage of activated polarization for the total polarization of the fuel electrode was reduced from 44% to 16% at the current density of 200 mA/cm$^2$. When stability of polarization with lapse of time on discharging at 200 mA/cm$^2$ was measured, it was confirmed that the conventional fuel electrode-producing process gave increase in polarization by 30 mV after initial stage passing of current for 3 hours as shown in FIG. 9. When a similar measurement was effected for the test cell according to the present invention (No. 2), the polarization was increased by 4 mV in 3 hours, and increased by 10 mV when current was passed for 20 hours, and the polarization has not substantially changed up to 50 hours. From this, it is judged that the fuel electrode according to the present invention has excellent stability in passing current.

Figure 5:
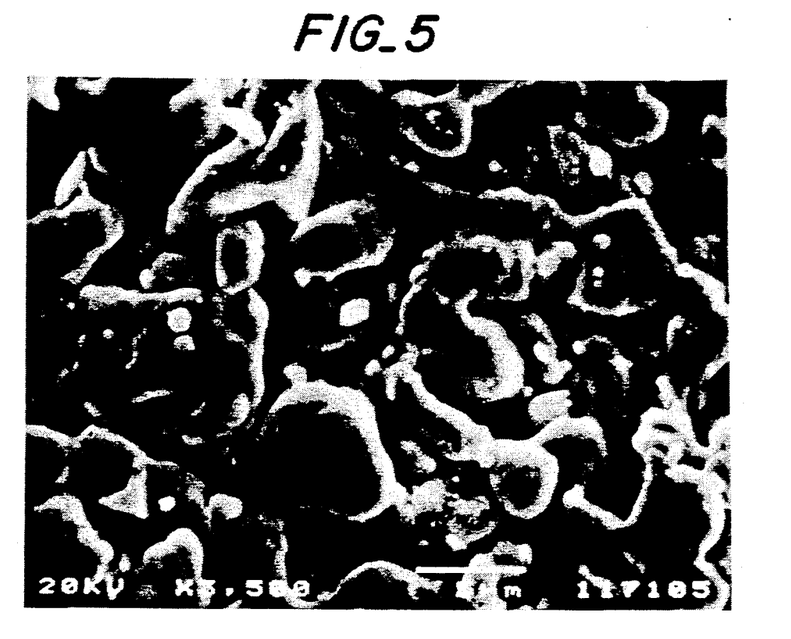
FIG. 5 is an SEM photograph showing a microstructure of a tissue of a fuel electrode in a standard cell prepared by a conventional process.
Figure 6:
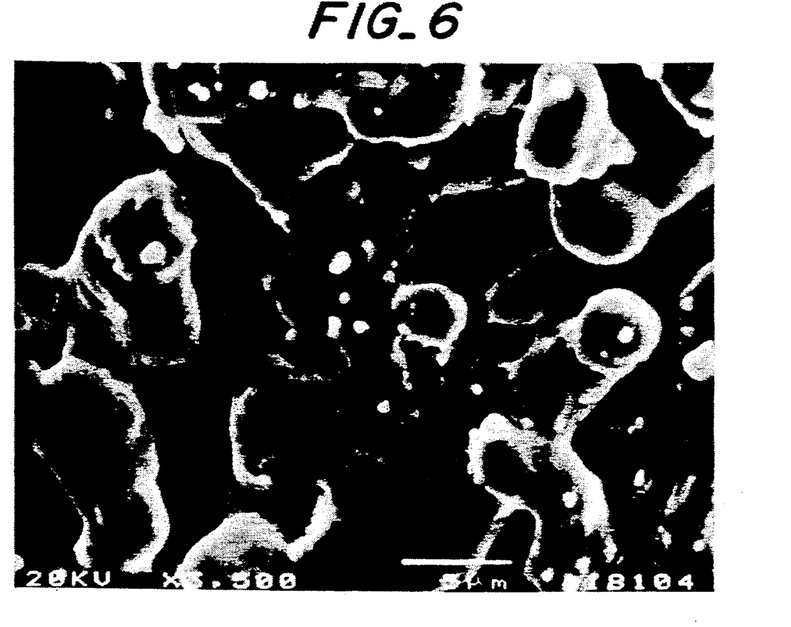
FIG. 6 is an SEM photograph showing a microstructure of the tissue of the fuel electrode of the standard cell through which electric current has been passed.

The above-mentioned improvement in the characteristics are all attributable to the microstructure featuring the fuel electrode according to the present invention. FIGS. 1, 2, 3 and 4 show the states of the microstructures of the fuel electrode prior to and posterior to the impregnation with the solution of the metallic compound, after the thermal decomposition, after the reduction, and after passing current for 50 hours, respectively. FIGS. 5 and 6 are the microstructures of the standard cell prior to and posterior to passing current for 20 hours, respectively. From this, it is seen that the standard cell had small effective area of the electrode even before passing current, and coagulation and sintering of the fuel electrode further proceeded after passing current for 20 hours. On the other hand, in the test cell (No. 2) to which the present invention was applied, the shell-like thin film tissue formed around nickel oxide by thermal decomposition of the solution of the metallic compound is firmly present around nickel particles after the reduction of nickel oxide to prevent coagulation and sintering of nickel due to the passing of current.

What is claimed is:

1. A fuel electrode for solid oxide fuel cells, said fuel electrode comprising:
    a porous fuel electrode skeleton comprising at least nickel; and
    a thin filmy tissue comprising a material which is the same material as that of an ion-conductive solid electrolyte body upon which said fuel electrode is to be formed, said thin filmy tissue covering the porous fuel electrode skeleton such that gaps are present between said thin filmy tissue and said porous fuel electrode skeleton.

2. The fuel electrode of claim 1, wherein the material for the fuel electrode skeleton is selected from the group consisting of nickel and nickel-zirconia composite.

3. The fuel electrode of claim 1, wherein the material comprising said thin filmy tissue is selected from the group consisting of zirconia stabilized or partially stabilized with at least one of $Y_2O_3$, CaO, MgO, and $Yb_2O_3$.

4. A process for producing a fuel electrode for solid oxide fuel cells, said process comprising the steps of:
    forming a porous skeleton film comprising nickel oxide on a surface of an ion-conductive solid electrolyte body;
    impregnating said porous skeleton film with a solution of a metallic compound capable of producing the same solid electrolyte material as that of said solid electrolyte body;
    heating said porous skeleton film to decompose said metallic compound and form a thin filmy tissue of said solid electrolyte material on said porous skeleton film; and
    reducing the nickel oxide in said porous skeleton film to nickel to thus form a porous fuel electrode skeleton film, whereby gaps are formed between said porous fuel electrode skeleton film and said thin filmy tissue due to a volume decrease of said porous skeleton film to said porous fuel electrode skeleton film during reduction of the nickel oxide to nickel.

5. The process of claim 4, wherein said metallic compound is selected from the group consisting of metallic soaps, metal alkoxides, metal amides, acetates and nitrates.

6. The process of claim 5, wherein the heating step is carried out within 900° C.–1000° C.

7. The process of claim 4, wherein said solution of a metallic compound includes 3–10 wt. % of a metallic component.

8. The process of claim 7, wherein the impregnating and heating steps are repeated sequentially 5–30 times, said heating step being carried out at a temperature of 400° C.–1000° C. and at 900° C.–1000° C. at least once during final stages of the repeated impregnating and heating steps.

9. A solid oxide fuel cell comprising:
    an ion-conductive solid electrolyte body;
    an air electrode provided on one surface of said solid electrolyte body; and
    a fuel electrode provided on an other surface of said electrolyte body, said fuel electrode comprising:
    i) a porous fuel electrode skeleton comprising at least nickel; and
    ii) a thin filmy tissue comprising the same material as that of said solid electrolyte body, said thin filmy tissue covering the porous fuel electrode skeleton such that gaps are present between said thin filmy tissue and said porous fuel electrode skeleton.

10. The solid oxide fuel cell of claim 9, wherein the material for the fuel electrode skeleton is selected from the group consisting of nickel and nickel-zirconia composite.

11. The solid oxide fuel cell according to claim 9, wherein the material comprising said thin filmy tissue is selected from the group consisting of zirconia stabilized or partially stabilized with at least one of $Y_2O_3$, CaO, MgO, and $Yb_2O_3$.

* * * * *